E. FULLER.
SHOCK ABSORBER.
APPLICATION FILED AUG. 13, 1918.
1,303,816. Patented May 13, 1919.
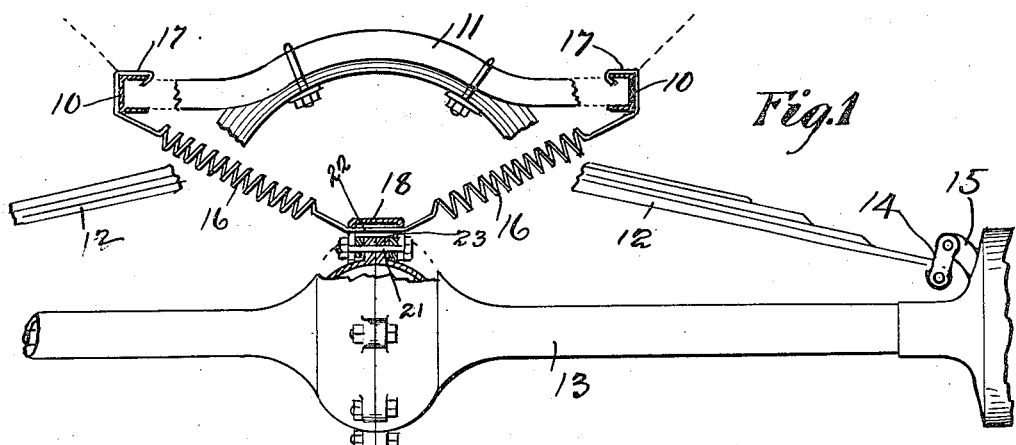
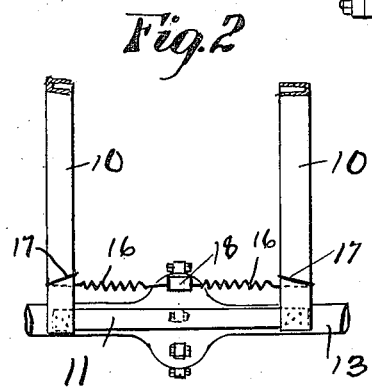
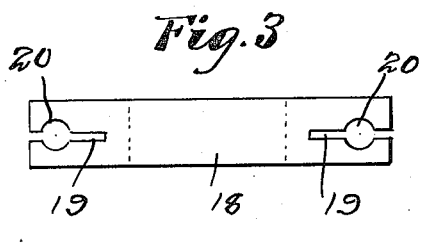
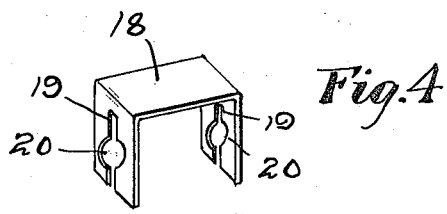
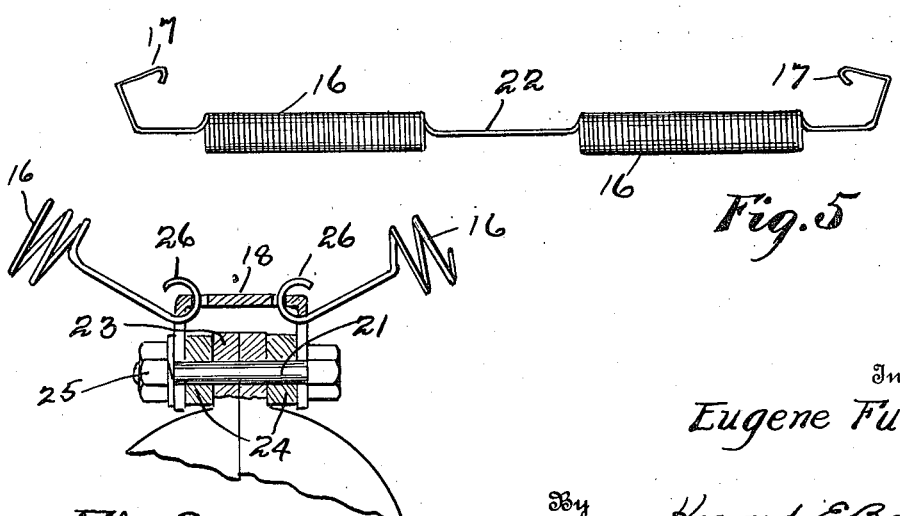
Inventor
Eugene Fuller
By Howard E. Barlow
Attorney

UNITED STATES PATENT OFFICE.

EUGENE FULLER, OF PROVIDENCE, RHODE ISLAND, ASSIGNOR OF ONE-HALF TO BENJAMIN F. TEFFT, JR., OF ARCTIC, RHODE ISLAND.

SHOCK-ABSORBER.

1,303,816.　　　　　Specification of Letters Patent.　　Patented May 13, 1919.

Application filed August 13, 1918. Serial No. 249,662.

*To all whom it may concern:*

Be it known that I, EUGENE FULLER, a citizen of the United States, and resident of the city of Providence, in the county of Providence and State of Rhode Island, have invented certain new and useful Improvements in Shock-Absorbers, of which the following is a specification.

This invention relates to shock absorbing devices of the class employing auxiliary springs for the purpose of preventing excessive rebound of the main vehicle springs while traveling rapidly over rough roads.

The objects of this invention are to provide an improvement in the construction and arrangement of auxiliary springs to operate in conjunction with the main supporting springs of a vehicle, which consists of a pair of radially-disposed coil springs located between the middle portion of the axle housing and widely separated spring supported vehicle elements, whereby the following results are obtained; first, the effect of the recoil of the main spring upon the body is nicely controlled; second, the side sway of the body is materially lessened, which effect is of considerable advantage particularly in vehicles where the body is supported on transversely-disposed springs; and third, by the use of radially-disposed springs the rocking or vertical motion of the wheels, due to uneven roads, is not transmitted to the body, except in a very slight degree. This is an improvement over shock absorbers which have auxiliary vertically-disposed springs attached to the side edges of the body and which lead directly to the axle housing, as on such springs vertical motion of the axle is directly communicated to the body while with my device such communication of motion is prevented.

Another feature of the invention is the extreme simplicity and inexpensive construction of the device and also the ease with which it may be applied to the regular standard type of vehicle for which it is designed without changing the structural parts of the machine.

With these and other objects in view, the invention consists of certain novel features of construction, as will be more fully described, and particularly pointed out in the appended claims.

In the accompanying drawings:

Figure 1— is a rear view of a portion of the vehicle chassis, showing my improved spring shock absorbing device as applied thereto.

Fig. 2— is a plan view of reduced size showing portions of the chassis beams and the position of the auxiliary springs relative to the rear axle housing and attached to said beams.

Fig. 3— is a view of the yoke member as punched from sheet stock, showing the slots formed therein for the reception of the spring wire.

Fig. 4— is a perspective view showing the yoke member bent into shape to be attached through one of the regular bolt holes to the axle housing.

Fig. 5— is a view of a pair of springs contracted, and showing them as having their adjacent ends connected.

Fig. 6— is a view showing a modified form of springs in which the ends are each separately connected to the yoke, the yoke itself being attached to the axle housing.

Referring to the drawings, 10 designates the two side beams of the chassis, which are connected by cross-beams 11, the whole being supported on the main vehicle springs 12. These main springs in the type of vehicle to which my improved shock absorbing device is attached, are disposed transversely of the vehicle or in line with the axle housing 13 to which it is loosely connected at its ends by means of shackles 14 to the brackets 15.

By this construction of springs the body is permitted considerable sway or sidewise motion as the vehicle rocks from side to side and also as the body is supported substantially at its center portion on this spring it is permitted somewhat of a rocking or rolling motion. Then again it is found that a main spring of this character is susceptible of an excessive rebound after having been quickly depressed.

To overcome or control these objectionable motions and steady the riding action of the body, I have provided an extremely simple, neat and inexpensive device which is that of a pair of radially-disposed coil springs 16, the outer end of each being bent up, over and down as at 17 to hook over the inner edge of the widely separated longitudinally-disposed beams 10, the opposite end of each spring being connected to the main axle housing substantially at the middle thereof.

In order to facilitate the connection to this housing, I have provided a yoke member 18 which is preferably stamped out of sheet stock and is illustrated in Fig. 3 as having its opposite ends slotted longitudinally as at 19, to permit this yoke to be readily passed onto the middle portion of the spring wire. A larger hole 20 is also punched in this plate for the reception of the bolt 21.

In applying these auxiliary springs to the vehicle, I preferably form the spring double having a plain connecting center portion 22, the opposite hook-shaped ends 17 are attached to the opposite beams 10, the yoke member is then placed over this central or plain portion of the wire between the coils which carries this wire up into the bottom of the slots 19, this yoke is then pressed downward elongating the springs and the bolt 21 is passed through the usual ear 23 in the housing, spacing washers 24 being preferably inserted to facilitate the connecting operation.

It is now only necessary to set up the nut 25 and the whole device is in position requiring less than fifteen minutes for the complete attaching operation and that without boring any holes in the regular vehicle parts and the expense of the device is the very minimum.

I do not wish to be limited to the connecting of both of the springs together at their middle portion by a continuous wire as in some cases the springs may be formed entirely separate and their lower ends 26 hooked through eyes in the yoke 18 as illustrated in Fig. 6.

The device is extremely simple and inexpensive in construction and practical and effective in its operation and by its use the riding qualities of a vehicle constructed in the manner described, are greatly improved.

The foregoing description is directed solely toward the construction illustrated, but I desire it to be understood that I reserve the privilege of resorting to all the mechanical changes to which the device is susceptible, the invention being defined and limited only by the terms of the appended claims.

I claim:

1. The combination with a vehicle axle housing, a main vehicle spring disposed substantially in line with the axis of said housing and a pair of spaced-apart longitudinally-disposed beams supported by said main spring, of a pair of radially-disposed auxiliary coil springs connected at their lower ends to said axle housing, and at each of their opposite ends to one of said beams.

2. A shock absorbing device comprising a yoke member fixed to the main shaft housing at its center, the arms of said yoke being slotted longitudinally to receive the auxiliary spring wire, a pair of spaced-apart-longitudinally-disposed beams supported by the main springs of the vehicle, and a pair of auxiliary coil springs having a middle connecting portion passing through said yoke slot and the opposite ends of said auxiliary springs being each connected to one of said beams.

In testimony whereof I affix my signature in presence of a witness.

EUGENE FULLER.

Witness:
HOWARD E. BARLOW.